UNITED STATES PATENT OFFICE.

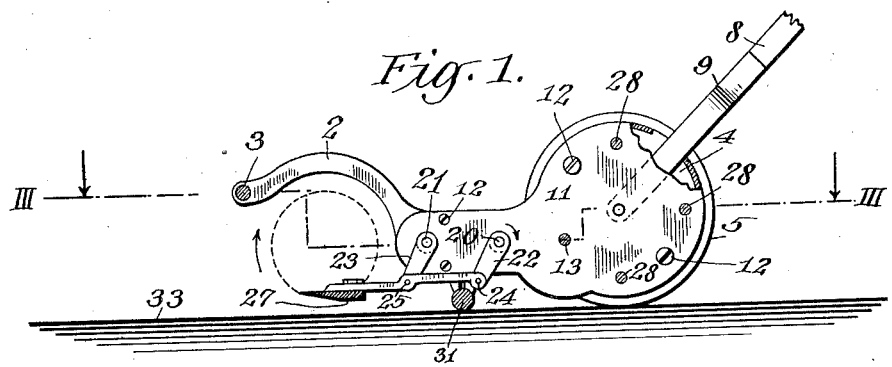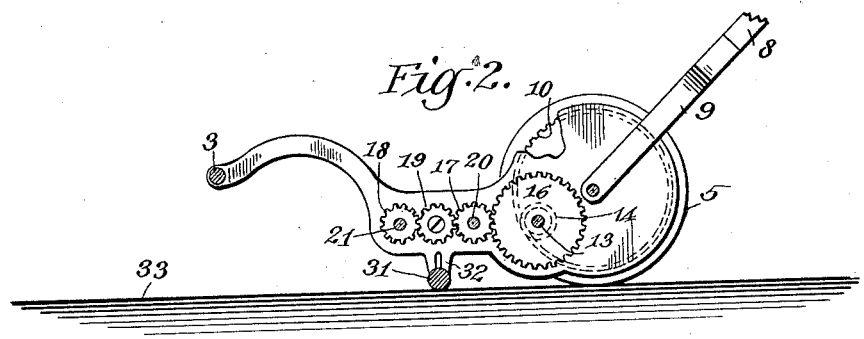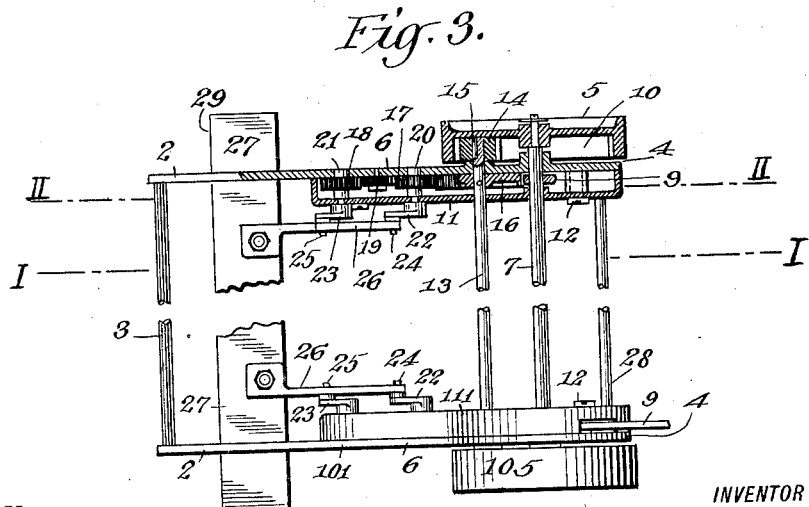

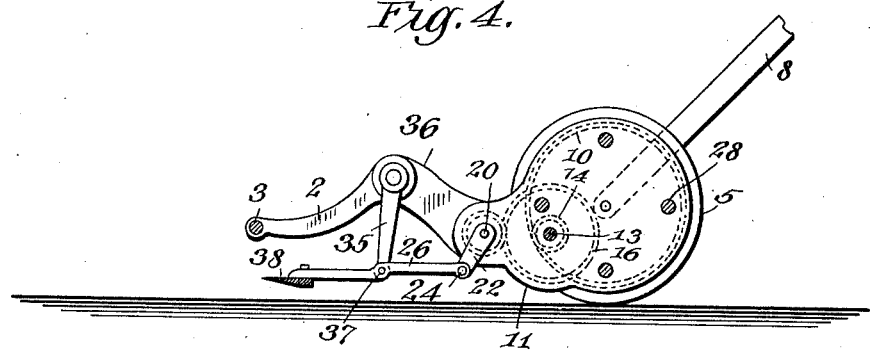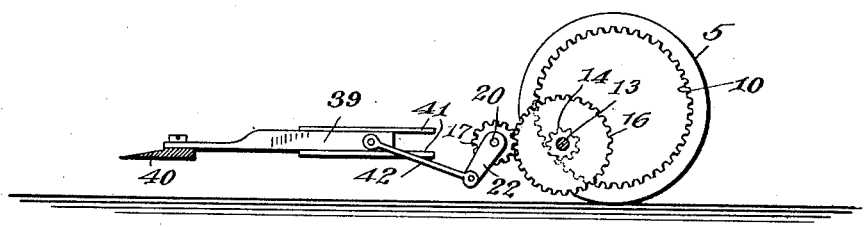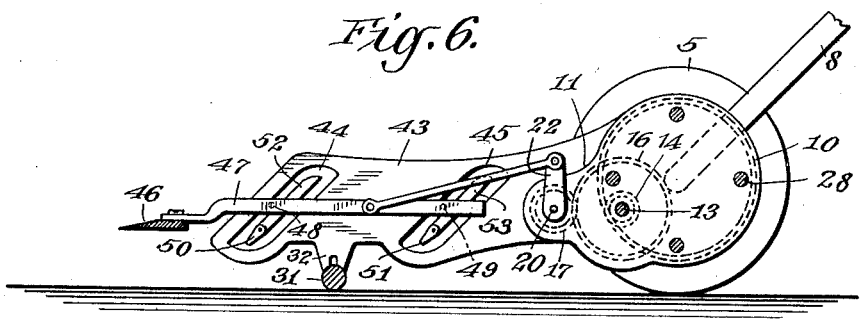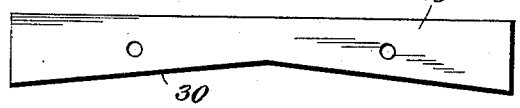

GUSTAV P. HELFRICH, OF NEW YORK, N. Y.

LAWN-MOWER.

1,089,556.  Specification of Letters Patent.  Patented Mar. 10, 1914.

Application filed December 17, 1910. Serial No. 597,753.

*To all whom it may concern:*

Be it known that I, GUSTAV P. HELFRICH, a citizen of the United States, and a resident of the borough of Bronx, city, county, and State of New York, have invented certain new and useful Improvements on Lawn-Mowers, set forth in the following specification.

This invention relates to mowers and with special reference to those particularly adapted for mowing lawns on which the grass has been allowed to grow to a considerable height.

An object of the invention is to provide for the mowing down of a swath equal to or greater in width than the span of the operating mechanism.

A further object of the invention is to provide for the mowing of a growth of a considerable height without cutting the stalks or blades of the growth at points other than the points of severance from the stubble.

In carrying out the objects of the invention a mowing blade is arranged to lie across the general path to be traversed by the mower; mechanism is attached thereto to impart a quick forward stroke to this cutting blade against the lowermost portions of the stalks to be cut and a return backward and preferably upward and downward stroke. This operative mechanism is arranged to be actuated in a suitable manner by a pair of bull-wheels of ordinary construction and provisions are made whereby the cutting blade is so located that its length may be varied within wide limits without in any way interfering with its forward and back cutting movement, so that it may span a greater space than that spanned by the bull wheels.

The above and further objects of the invention will be set forth more fully in the accompanying claims, which should be read in connection with the following specification, which refers specifically to the accompanying drawings, which form a part of this application and in which,—

Figure 1 is a cross section through line I—I of Fig. 3, but showing parts in vertical elevation; Fig. 2 is a section through line II—II of Fig. 3, with the gear casing removed and showing parts in elevation; Fig. 3 is a horizontal section through line III—III of Fig. 1, but showing parts in plan; Fig. 4 is a view corresponding to Fig. 1, but showing a modification of the mechanism for imparting a forward and backward movement for the cutting blade; Fig. 5 is a diagrammatic view corresponding to Fig. 1 showing a second modification of mechanism for imparting a forward and back movement of the cutting blade; Fig. 6 is a diagrammatic view corresponding in position to that of Fig. 1, but showing a third modification of the mechanism for imparting a forward and backward movement of the cutting blade; and Fig. 7 is a plan view showing a modification in the shape of the cutting blade.

Referring now more in detail to the drawings 1 and 101 designate respectively symmetrical right and left hand frame castings, each comprising a forwardly extending goose-neck member 2 which is cross-connected by the guard rod 3 to its neighbor; a disk-shaped enlargement 4 covering the inner face of the receptacle bull wheels 5 and 105; and the intermediate gear mounting portions 6. The bull wheels are mounted on journal bearings at the ends of the central stationary cross shaft 7 which is suitably fixed to the frame pieces 1 and 101 to space them apart and hold them parallel to one another. A driving handle 8 of ordinary construction may have its forked ends 9 pivoted to this central shaft 7.

The inner flange of each bull wheel is formed as an internal gear, indicated by 10.

The symmetrical gear boxes 11 and 111 are secured respectively to the side frames 1 and 101 in a suitable manner as by screw bolts 12. Each gear box together with the portion 6 of the corresponding side frame forms a suitable mounting for the transmission gears of the blade driving mechanism. An equalizing shaft 13 extends crosswise through each side frame and terminates at each end in the neighborhood of the flange of the bull wheel. It carries at each end a spur gear 14 in mesh with the internal teeth 10 of the bull wheel and connected to the end of the shaft 13 by means of the ratchet clutch 15. Just inside of each side frame a transmission gear 16 is keyed to the shaft 13 so that, if either or both of the gears 14 are driven by its corresponding bull wheel, the shaft 13 of the transmission gears 16 will be driven. Should one of the bull wheels slip, the ratchet clutch 15, usual to mowers, permits the bull wheel which is actually gripping the ground to do the driving.

The transmission gear 16 is in mesh with the spur gear 17 which itself is geared to a second spur gear 18 of the same number of teeth by the idler 19. The spur gears 17 and 18 are keyed respectively to crank shafts 20 and 21, journaled in the corresponding side frame and gear box. The crank shafts 20 and 21 are each provided with cranks 22 and 23 occupying the same angular position and having crank pins 24 and 25 suitably journaled to each parallel motion blade carrier 26 which, at its forward end, is bolted to one end of the cutting blade 27.

For the purpose of further stiffening the frame work of the mower, additional cross rods 28 may cross connect the gear boxes 11 and 111 as indicated. The cutting blade 27 is preferably of a lateral span greater than the span between the bull wheels 5 and 105 and may extend out beyond the bull wheels. It may have a straight line cutting edge 29 or a cutting edge of any other suitable contour as for instance the doubly inclined cutting edge 30 shown for a blade 29' in Fig. 7. Forward of the bull wheels 5 and 105 a roller 31 serves as a forward support for the mower. This roller is adjustably supported at its ends in a well known manner as in a slotted extension 32 forming a part of the side frames. The adjustment of the roller 31 determines the cutting elevation above the ground 33 for the blade 27.

Operation: The mower is driven in a manner usual with machines of this type as by the application of manual pressure to the handle 8. The forward progress of the mower causes the rotation of the bull wheels 5 and 105 by reason of their frictional contact with the ground. The spur gears 14 are driven by the bull wheels and they in turn impart a counterclockwise rotation to the transmission shaft 13 with which the transmission gears 16 rotate. Each gear 16 drives its spur gear 17 in a clockwise direction and through the medium of the idler 19 drives the spur gear 18 in a clockwise direction at the same speed at which the spur gear 17 is driven. The spur gears 17 and 19 impart their own clockwise rotation to the crank shafts 20 and 21 so that the crank arms 22 and 23 are both rotated synchronously in a clockwise direction to impart a parallel motion to each of the arms 26 so that each point on one of the arms or a part rigidly connected with an arm 26 describes a circle in a clockwise direction as shown in Figs. 1 and 2. Consequently the knife blade 27 bolted to the arms 26 partakes of the same motion and its cutting edge 29 travels in a clockwise direction throughout the dotted circle shown in Fig. 1 relatively to the mower itself. A forward quick stroke is thereby given to the cutting edge of the blade 27 at the lowermost part of its cycle so that the grass stalks to be cut are struck a quick sharp blow, the speed of which is increased by the forward progress of the mower. The continued movement of the blade 27 is upward, backward and then downward and of course, it is to be understood that the path of the cutting edge 29 relatively to the ground is a curve very much flatter than a circle due to the forward translation of the blade at the same time it is being rotated by its driving mechanism in the mower.

The invention contemplates other driving means for the blade described with particular reference to Figs. 1, 2 and 3. For instance the diagram of Fig. 4 illustrates the same general type of mechanism previously described in connection with Figs. 1, 2 and 3 so far as the bull wheels, spur gears 14, transmission shaft 13 and transmission gears 16 and spur gears 17, with their shafts 20 and cranks 22, are concerned. The remainder of the mechanism, however, is somewhat modified. The blade supporting arms 26 are each pivoted at their respective rear ends to the crank pins 24 of the cranks 22 but instead of a second driving crank such as the crank 23 an idle crank 35 is pivotally suspended from a suitably shaped side frame 36 and is pivoted by the crank pin 37 to an intermediate portion of the arm 26. In this modification the blade 38 bolted to the blade supporting arms 26, does not describe a perfect circle relatively to the mower, but is given a forward and back reciprocating movement in a manner comprehended by the invention, although, of course, the actual movement of the blade 38 has an up and down component as will be obvious to those skilled in the art.

The diagram of Fig. 5 shows another modification in that each supporting arm 39 for the cutting blade 40 is slidably mounted to reciprocate horizontally in a suitably formed guideway 41, each supporting arm 39 being reciprocated by the pitman 42, driven by the crank 22.

The diagram of Fig. 6 shows still another modification in which each side frame 43 is provided with a pair of camways 44 and 45. The cutting blade 46 is bolted to the forward ends of suitable supporting arms 47 from which the cam followers 48 and 49 project laterally into the respective camways 44 and 45. These camways are inclined as indicated and traps 50 and 51 are provided in the lower portions thereof to insure the proper return stroke for the arms 47. In the diagram of Fig. 6 the arm 47 and the attached blade are on the return stroke, the forward stroke being such that the followers 48 and 49 engage the rear faces of the central bearings forming a part of the camways. Upon the completion of the forward stroke the traps 50 and 51 swing over and to the rear of the cam followers 48 and 49 so as to cause the return stroke to be against the forward faces of the barriers 52 and 53.

According to all embodiments of the invention, the cutting blade 27 may be of such a lateral extent or span as to exceed that of the span of the bull wheels. In this manner a lawn may be mowed completely to its edge along flower beds or a walk while the bull wheels are actually traversing the lawn itself. In addition the disadvantages occasioned by a bull wheel rolling down a swath of uncut grass is avoided. The bull wheels run only upon an area which has actually been cut by the cutting blade. Furthermore a decided advantage provided for by the invention is the non-interference of all the working parts with the grass to be cut so that very rank and tall growths may successfully be mowed with the machine, which is impossible with an overstroke machine. In this connection emphasis is laid upon the understroke character of the cutting blade embodied in this invention. Also the forward mounting of a single cutting blade as described herein away from the frame of the mower permits various cutting strokes to be imparted to the blade, it being merely necessary that the cutting stroke have a forward component. There is nothing to preclude combining a lateral movement in the direction of the blade itself.

Although various modifications of the operating mechanism for the cutting blade have been illustrated, it is to be understood that the following claims include not only what has been illustrated, but all modifications falling within the scope thereof.

What is claimed and what is desired to be secured by United States Letters Patent is:—

1. In a mower, in combination, a frame; a pair of bull wheels oppositely journaled to said frame; a substantially horizontal cutting blade movably supported in front of said bull wheels in such a manner that the edge of said blade will be constrained to travel in a curved path relative to said frame; and operating mechanism driven by said bull wheels for imparting a forward and back movement to said blade, said blade having its flat faces at all times substantially parallel with the longitudinal axis of the frame.

2. In a mower, in combination, a frame; a pair of bull wheels journaled to said frame; a pair of laterally spaced parallel motion arms; a cutting blade secured to the forward ends of said parallel motion arms, said arms being movably supported by said frame in such a manner that the edge of said blade will be constrained to travel forward and backward in a curved path; and mechanism operated by said bull wheels for synchronously driving said arms with a forward and back movement.

3. In a mower, in combination, a frame; a pair of bull wheels journaled to rotate independently of one another; a substantially horizontal cutting blade movably supported in front of said bull wheels; and operating mechanism for imparting a forward and back movement to said blade and adapted to be actuated by either or both of said bull wheels, said blade having its flat faces at all times substantially parallel with the longitudinal axis of the frame.

4. In a mower, in combination, a frame; a pair of bull wheels journaled in said frame to rotate independently of one another; a pair of laterally spaced parallel motion arms; a cutting blade secured to the forward ends of said arms; and means for synchronously driving said arms with a forward and back movement and adapted to be actuated by either or both of said bull wheels.

5. In a mower, in combination, a frame; a bull wheel journaled in said frame; a pair of laterally spaced parallel motion arms supported by said frame; a cutting blade secured to the forward ends of said arms; a crank journaled in said frame and operatively connected to said arms to drive the same with a forward and back movement; means controlling the movement of said arms to direct the travel of said blade in a curved path; and means operatively associating with said bull wheels for rotating said crank.

6. In a mower, in combination, a frame; a pair of bull wheels oppositely journaled in said frame each bull wheel having an internal gear; a spur gear for each bull wheel and in mesh with said internal gears; a transmission shaft connected at its respective ends with said spur gears through the medium of a ratchet clutch; a pair of transmission gears keyed to said transmission shaft adjacent the ends thereof; a spur gear for and in mesh with each transmission gear; a driving crank arranged to be driven by each of said spur gears; a cutting blade preferably mounted forward of said cranks and constrained to move with a forward and back movement; and means connecting each crank with the corresponding end of said cutting blade for operating the same.

In witness whereof, I have signed my name to this specification, in the presence of two subscribing witnesses.

GUSTAV P. HELFRICH.

Witnesses:
FREDERICK I. BROWER,
L. ALTMAN.

---

Copies of this patent may be obtained for five cents each, by addressing the "Commissioner of Patents, Washington, D. C."